United States Patent [19]

Takano

[11] 4,086,449

[45] Apr. 25, 1978

[54] LOUDSPEAKER WITH BURNING RESISTANT DIAPHRAGM

[75] Inventor: Kazuro Takano, Hirakata, Japan

[73] Assignee: Matsushita Electric Industrial Co., Ltd., Kadoma, Japan

[21] Appl. No.: 739,141

[22] Filed: Nov. 5, 1976

Related U.S. Application Data

[63] Continuation-in-part of Ser. No. 576,380, May 12, 1975, abandoned.

[30] Foreign Application Priority Data

May 14, 1974 Japan .................................. 49-54239

[51] Int. Cl.$^2$ ........................ H04R 7/00; G10K 13/00; C09K 3/28

[52] U.S. Cl. ................................ 179/181 R; 162/159; 181/167; 252/8.1; 260/2 EN

[58] Field of Search .................... 179/181 R; 181/167, 181/169, 170; 162/159; 252/8.1; 260/2 EN

[56] References Cited

U.S. PATENT DOCUMENTS

| | | | |
|---|---|---|---|
| 1,759,387 | 5/1930 | Bateholts | 181/170 |
| 3,565,679 | 2/1971 | Strother, Jr. | 260/2 EN X |
| 3,723,074 | 3/1973 | Sears et al. | 252/8.1 X |
| 3,907,063 | 9/1975 | Nakazawa et al. | 181/169 |
| 3,989,531 | 11/1976 | Orlando et al. | 252/8.1 X |

FOREIGN PATENT DOCUMENTS

| | | |
|---|---|---|
| 1,184,878 | 3/1970 | United Kingdom. |

*Primary Examiner*—Thomas W. Brown
*Attorney, Agent, or Firm*—Stevens, Davis, Miller & Mosher

[57] ABSTRACT

The invention discloses a loudspeaker with a diaphragm made of pulp fibers treated with a chemical condensation product of an ammonium salt of a polyphosphoric acid having a high degree of condensation with polyethyleneimine. The diaphragm has burning resistance, and the deterioration of acoustic characteristics may be prevented.

1 Claim, 3 Drawing Figures

LOUDSPEAKER WITH BURNING RESISTANT DIAPHRAGM

CROSS-REFERENCE TO RELATED APPLICATION

This is a continuation-in-part application of copending patent application Ser. No. 576,380 filed in May 12, 1975, now abandoned.

BACKGROUND OF THE INVENTION

The present invention relates to a loudspeaker with a diaphragm made of pulp fibers combined with a burning resistant agent.

The diaphragms of the conventional speakers are, in general, made of pulp fibers so that there is a fear that the voice coil and the diaphragm are burnt due to overheating of the voice coil when an excessive input is applied thereto. To overcome this problem, there has been devised and demonstrated a speaker diaphragm of the type in which a burning resistance layer is formed upon the surface of the diaphragm. However, the mass of the diaphragm is increased so that the satisfactory characteristics of the loudspeaker cannot be attained. Another attempt has been made to render the diaphragm burning resistance by impregnating the pulp fibers with a water soluble inorganic burning resisting agent such as ammonium secondary phosphate. However, the diaphragm exhibits a moisture absorbing property causing the corrosion of metal parts of the speaker so that such diaphragm is not adapted for use in the speaker. There has been a further attempt for rendering the pulp fibers burning resistant by treating them with an organic agent but the treatment cost is very expensive. Furthermore much smoke is produced when the diaphragm made of such pulp fibers should be burnt.

The present invention was made to overcome the above problems.

DETAILED DESCRIPTION

Figure 1:
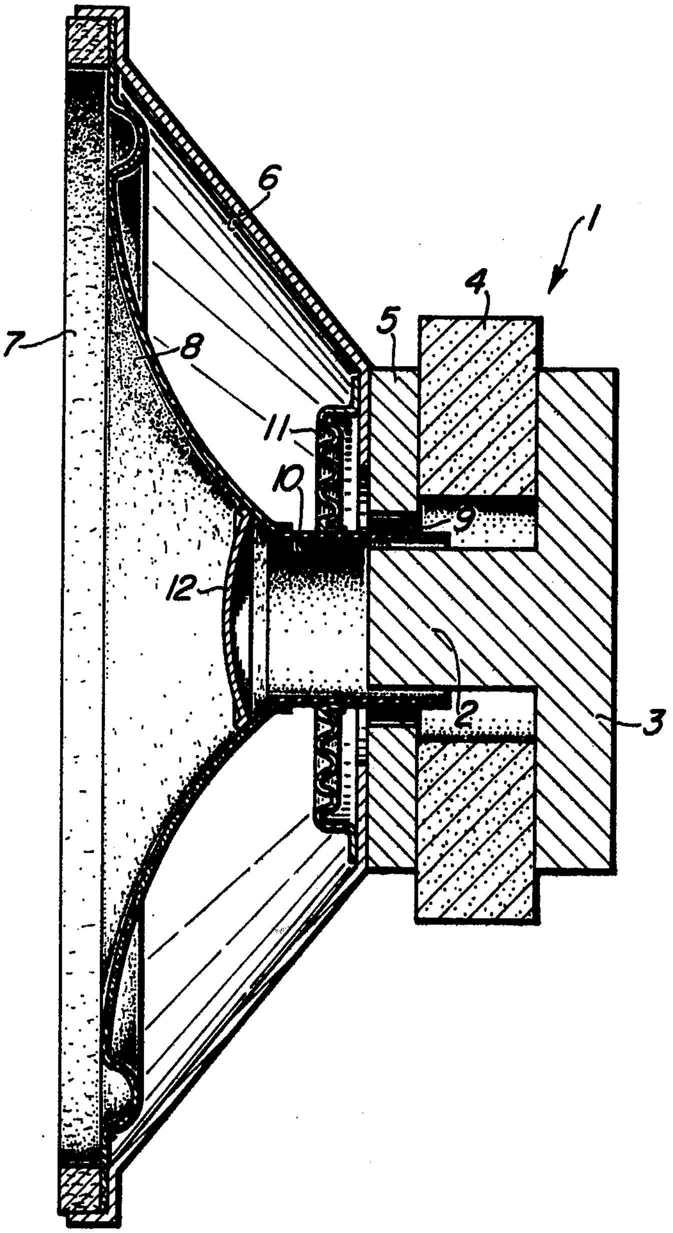
FIG. 1 is a sectional view of a loudspeaker incorporating a diaphragm made of pulp fibers treated in accordance with the present invention.

According to the present invention, pulp fibers are treated by the chemical reaction between water-insoluble highly condensed ammonium polyphosphate and highly active polyethyleneimine, and thereafter a neoprene series rubber latex is deposited or set upon the pulp fibers. The diaphragm of the loudspeaker of the present invention is made of these pulp fibers treated in the manner described above.

The treated fibers in the diaphragm exhibit not only the improved physical strength properties such as swelling resistance, size degree, tearing strength and so on, but also are stable and have improved burning resistance. Furthermore since water-insoluble highly condensed ammonium polyphosphate is used, the poor moisture absorption property of and corrosion of metal parts of the loudspeakers by the conventional speaker diaphragms made of pulp impregnated with a burning resistance agent, are solved.

When water-insoluble highly condensed ammonium polyphosphate is mixed with pulp fibers under a mechanical force, for example, by stirring the yield of the ammonium polyphosphate deposited on the pulp fibers may be lowered and the burning resistance properties of the paper prepared from the treated pulp fibers is also reduced due to the destruction of inter-molecular linkages of the particles of the ammonium polyphosphate and to the isolation of the particles of the ammonium polyphosphate from the pulp fibers.

Furthermore, when the pH of the mixture of pulp fibers and the ammonium polyphosphate is not adjusted up to about pH 4 - 5, the ammonium polyphosphate quickly coagulates to form a heterogeneous gel in the form of flock which makes the mixture viscous and results in paper making operations difficult.

In order to overcome such drawbacks, aluminum sulfate can be added to the mixture of pulp fibers and water-insoluble highly condensed ammonium polyphosphate for adjusting the pH of the mixture up to pH 4 - 5 to disperse the particles of the ammonium polyphosphate moderately and homogeneously and also the effect the fixation of particles of the ammonium polyphosphate on to the pulp fibers.

Neoprene series rubber latex is further added to enforce the tight binding of the water-insoluble highly condensed ammonium polyphosphate and the pulp fiber.

The water-insoluble highly condensed ammonium polyphosphate used in the present invention is a composition mainly consisting of an ammonium polyphosphate having the general formula $(NH_4)_{n+2}P_nO_{3n+1}$ (wherein $n = 150 - 200$) represented by the following structural formula:

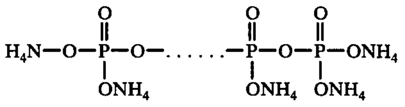

The phosphorus and nitrogen contents in the ammonium polyphosphate can be of P = 31 -32% by weight and N = 14 -16% by weight respectively. The water-insoluble highly condensed ammonium polyphosphate is added in the range of 30 - 40% by weight of the pulp fibers to give burning resistance property of the paper prepared therefrom.

The neoprene series rubber latex is added in the range of 5 -6% by weight of the pulp fibers.

The polyethyleneimine used in the present invention is an aqueous solution of polyethyleneimine having the general formula

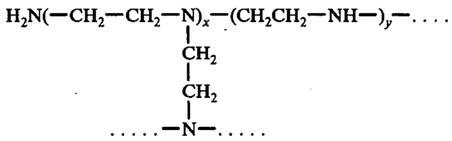

and is added in the range of 2 - 3% by weight of the pulp fibers.

Next referring to FIG. 1, one preferred embodiment of a loudspeaker in accordance with the present invention will be described. An external field system 1 comprises a plate 3 with a central pole piece 2, a ring-shaped magnet 4, and a ring-shaped upper plate 5. A frame 6 is attached to the field system 1, and a diaphragm 8 made of the material described above has its periphery attached to the frame 6 with a gasket 7. From the center aperture of the diaphragm 8 is suspended a coil bobbin 10 around which is wound a voice coil 9 and which is also supported by a damper 11. A dust cap 12 is attached to the diaphragm 8 to cover the center aperture thereof.

Next some examples of the treatment of pulp fibers for loudspeaker diaphragms in accordance with the present invention will be described.

EXAMPLE 1

(Partial Treatment of Pulp Fibers)

Pulp fibers were stirred in a beater and 15 – 35% by weight of Sumisafe PM* was added to the pulp fibers under stirring slowly. The pulp fibers were coagulated in the form of flock.

* Sumisafe PM — a trademark for a water-insoluble highly condensed ammonium polyphosphate, manufactured by Sumitomo Chemical Company, Ltd., Osaka, Japan, having the following properties: Appearance: White powder: Phosphorus content: 20.42% wt. Nitrogen content: 32.21% wt. Solubility in water: Less than 5% wt. (Insoluble matters = more than 95% wt.) Paticle size: 98% by weight passed through 325 mesh sieve: Polymerization degree: 150 – 200. Further, 2 – 3% by weight of Epomin P-1000** was added to the mixture.

Epomin P-1000** — a trademark for polyethyleneimine manufactured by Nippon Shokubai Kagaku Kogyo Co., Ltd., Tokyo, Japan, having the following properties: Appearance: Transparent viscous aqueous solution: Ionic characteristics: Cathionic: Sp. gr.: 1.0 at 25° C: Thermal decomposition temperature: 200° – 250° C: Solidification point: –3° C.

The yield of the water-insoluble highly condensed ammonium polyphosphate based on the pulp fibers was 70 – 80% by weight in this step. However, when the pulp fibers were uniformly dispersed by additional mixing, the yield was decreased to less than 50%. The results are shown in Table 1. As can be seen from the table, 25 – 30% by weight of highly condensed ammonium polyphosphate must be added for satisfying burning resistance and self-extinguishing properties of the paper.

When the mixture was stirred until the pulp-fibers become uniformly dispersed, the burning resistance property of the paper was decreased, and the self-extinguishing property was lost even when 35% by weight of the water-insoluble highly condensed ammonium polyphosphate was added. Young's modulus of the paper was reduced by about 40% as compared with paper prepared from the pulp fibers without the treatment of the present invention, and the size degree of the paper was zero. A length of scorched area was measured by a method for blowing a paper by a gas burner of the type burning a gas mainly consisting of methane gas.

Table 1

| Ratio of addition in % of highly condensed ammonium polyphosphate (based on pulp fibers = 100) | Density g/cm³ ρ | Young's modulus E | E/ρ | Yield of highly condensed ammonium polyphosphate (based on pulp fibers = 100) | Length of scorched area cm |
|---|---|---|---|---|---|
| 0% | 0.383 | $1.26 \times 10^{10}$ | $3.29 \times 10^{7}$ | — | — |
| 15% | 0.390 | $0.85 \times 10^{10}$ | $2.17 \times 10^{7}$ | 78% | — |
| 20% | 0.354 | $0.87 \times 10^{10}$ | $2.47 \times 10^{7}$ | 88% | — |
| 25% | 0.352 | $0.95 \times 10^{10}$ | $2.67 \times 10^{7}$ | 73% | 10 |
| 30% | 0.349 | $0.93 \times 10^{10}$ | $2.66 \times 10^{7}$ | 78% | 6.5 |
| 35% | 0.369 | $0.87 \times 10^{10}$ | $2.36 \times 10^{7}$ | 76% | 4.5 |

EXAMPLE 2

(Complete Treatment of Pulp Fibers)

Pulp fibers were stirred in a beater and 20 – 30% by weight of Sumisafe PM was added to the pulp fibers under stirring slowly. Further, 2 – 3% by weight of Epomin P-1000 was added under stirring to the mixture. Then aluminum sulfate was added to the above mixture under stirring to adjust the pH of the mixture up to 4 – 5. Thereafter, 5 – 6% by weight of Neoprene Latex 736*** was added under stirring and the whole mixture was sufficiently mixed until the pulp fibers were uniformly dispersed.

*** Neoprene Latex 736 — a trademark for a neoprene series rubber latex manufactured by Showa Neoprene Co., Ltd., Tokyo, Japan, having the following properties: Content of solid matter: 34.5% by weight: pH: 11.5: Sp. gr.: 1.06.

The yield of the water-insoluble highly condensed ammonium polyphosphate based on the pulp fibers and this physical properties of the papers thus prepared are shown in Table 2.

Table 2

| Ratio of addition in % of highly condensed ammonium polyphosphate (based on pulp fibers = 100) | Density g/cm³ ρ | Young' modulus E | E/ρ | Yield of highly condensed ammonium polyphosphate (based on pulp fibers = 100) | Length of scorched area cm |
|---|---|---|---|---|---|
| 0% | 0.343 | $1.03 \times 10^{10}$ | $3.0 \times 10^{7}$ | — | — |
| 20% | 0.357 | $1.07 \times 10^{10}$ | $3.0 \times 10^{7}$ | 81% | — |
| 26% | 0.326 | $0.98 \times 10^{10}$ | $3.0 \times 10^{7}$ | 75% | 7.5 |
| 30% | 0.333 | $1.10 \times 10^{10}$ | $3.3 \times 10^{7}$ | 73% | 5.0 |

The stability of burning resistance as well as Young's modulus may be improved by the addition of 5 to 6% of neoprene series rubber latex. Furthermore, swelling resistance, water resistance and tearing strength may also be improved. Therefore the diaphragms made of the materials prepared in accordance with the present invention are highly reliable. The results are shown in Table 3.

Table 3

| Ratio of addition of neoprene (based on pulp fibers = 100) | Swelling resistance | Tearing Strength |
|---|---|---|
| 0% | 100 | 100 |
| 2% | 122 | 110 |
| 5% | 150 | 123 |
| 10% | 175 | 145 |

The pulp fibers which are treated in the manner described above may be made into the diaphragms by the conventional paper making method. Alternatively, the sheet of paper made of these pulp fibers may be pressed into a diaphragm.

Figure 2:
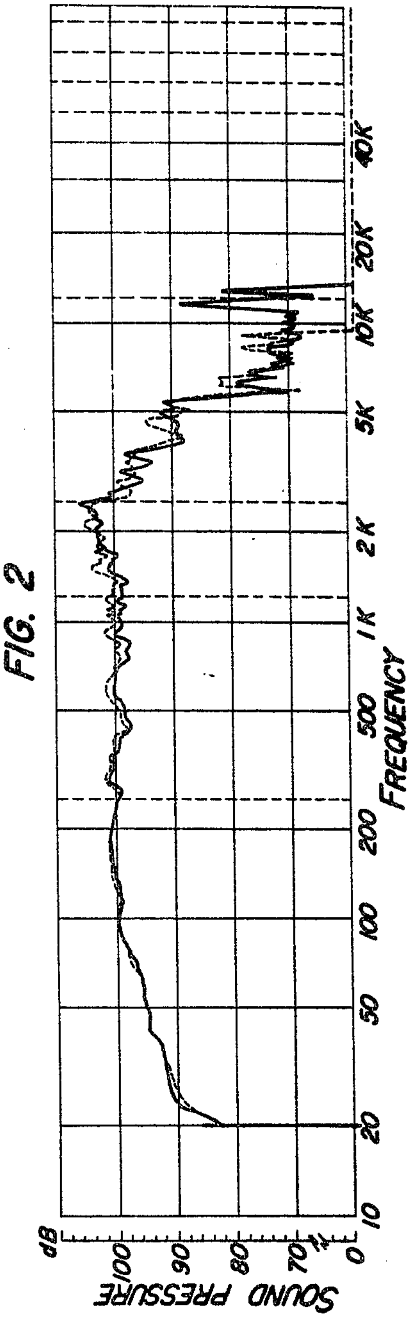
FIG. 2 shows the frequency response of the diaphragm made of pulp fibers partially treated in accordance with the present invention.

The frequency characteristic curve of the speaker with the diaphragm made of the pulp fibers treated in the manner described in Example 1 is indicated by the solid line curve in FIG. 2. Since the Young's modulus is smaller than that of the diaphragm made of the pulp fibers not treated, the response at higher frequencies is not satisfactory even though the response at lower frequencies is satisfactory. The frequency response curve of the loudspeaker with the diaphragm made of the fibers not treated is shown by the dotted curve in FIG. 2.

Figure 3:
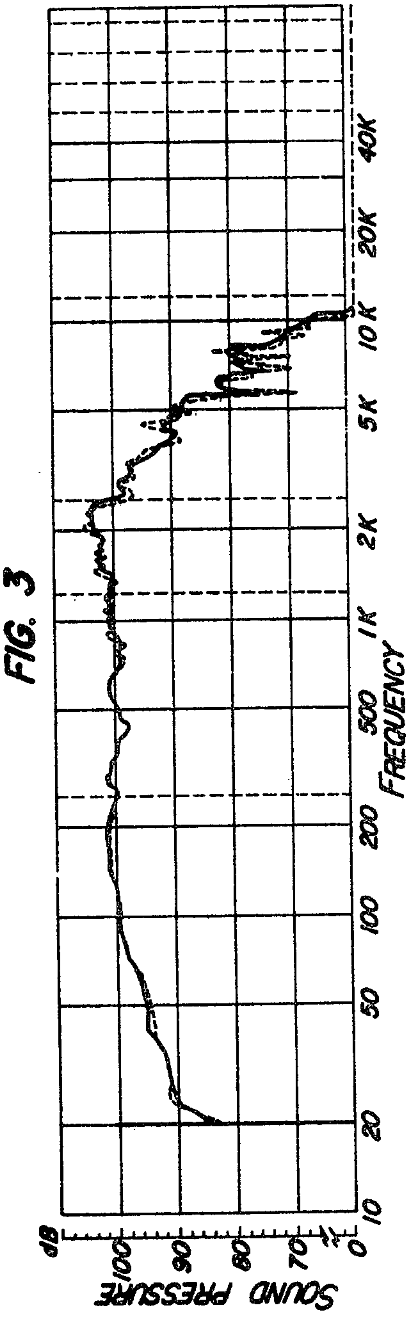
FIG. 3 shows the frequency response of the diaphragm made of pulp fibers completely treated in accordance with the present invention.

The frequency response curves of the loudspeakers with the diaphragms made of the pulp fibers treated in the manner described in Example 2 and the pulp fibers not treated, respectively, are indicated by the solid and dotted curves, respectively, in FIG. 3. Young's modulus of the former is substantially equal to that of the latter so that their frequency responses are substantially equal in both the low and high frequency ranges.

The burning resistance may be further improved when glass fibers, asbestos fibers, Polyclar and Modaacrylic fibers are added. The mixture may be made into the diaphragms with the burning resistance property by the conventional paper making method.

As described above, according to the present invention, the physical strength properties such as swelling resistance, tearing strength and so on of the diaphragms for the loudspeakers may be considerably improved, and the diaphragms are made burning resistant. Furthermore the corrosion of the metal parts of the speakers may be prevented, and the deterioration of the acoustic characteristics may be prevented.

What is claimed is:

1. In a loudspeaker with a diaphragm made of pulp fibers, the improvement comprising using as said pulp fibers, pulp fibers that have been deposited with about 30 to about 40% by weight of a mixture consisting of highly condensed water-insoluble ammonium polyphosphate having been chemically condensed by the addition of about 2 to about 3% by weight of polyethyleneimine and having been further mixed with about 5 to about 6% by weight of a neoprene series rubber latex, all percentages by weight based on said pulp fibers.

* * * * *